(12) United States Patent
Register (10) Patent No.: US 10,882,218 B2
(45) Date of Patent: Jan. 5, 2021

(54) TOOL CONFIGURED TO HAVE A CHANGEABLE SHAPE

(71) Applicant: The Boeing Company, Chicago, IL (US)

(72) Inventor: Justin H. Register, Charleston, SC (US)

(73) Assignee: The Boeing Company, Chicago, IL (US)

( * ) Notice: Subject to any disclaimer, the term of this patent is extended or adjusted under 35 U.S.C. 154(b) by 449 days.

(21) Appl. No.: 15/485,918

(22) Filed: Apr. 12, 2017

(65) Prior Publication Data

US 2018/0297241 A1    Oct. 18, 2018

(51) Int. Cl.
| | |
|---|---|
| *B29C 33/02* | (2006.01) |
| *B29C 73/24* | (2006.01) |
| *B29C 33/30* | (2006.01) |
| *B29C 33/40* | (2006.01) |
| *B29C 73/04* | (2006.01) |

(52) U.S. Cl.
CPC ............ *B29C 33/02* (2013.01); *B29C 33/308* (2013.01); *B29C 73/24* (2013.01); *B29C 33/40* (2013.01); *B29C 73/04* (2013.01); *B29K 2901/12* (2013.01)

(58) Field of Classification Search
CPC .... B29C 33/02; B29C 33/308; B29K 2901/12
See application file for complete search history.

(56) References Cited

U.S. PATENT DOCUMENTS

| | | | |
|---|---|---|---|
| 3,387,333 A | 6/1968 | Irvine et al. | |
| 6,589,472 B1 * | 7/2003 | Benson | B29C 43/3642 264/257 |
| 2004/0149733 A1 * | 8/2004 | Abbott | B29C 33/02 219/535 |
| 2017/0232644 A1 * | 8/2017 | Sellinger | B29C 35/02 264/404 |
| 2017/0291404 A1 * | 10/2017 | Register | B32B 37/06 |

* cited by examiner

*Primary Examiner* — James Sanders
(74) *Attorney, Agent, or Firm* — Yee & Associates, P.C.

(57) ABSTRACT

A tool is configured to have a changeable shape. The tool comprises a thermoplastic polymeric material, resistive heating elements within the thermoplastic polymeric material, and a flexible casing encapsulating the thermoplastic polymeric material and resistive heating elements.

20 Claims, 5 Drawing Sheets

TOOL CONFIGURED TO HAVE A CHANGEABLE SHAPE

BACKGROUND INFORMATION

1. Field

The present disclosure relates generally to manufacturing and, more specifically, to manufacturing using a mold. Still more particularly, the present disclosure relates to a tool configured to have a changeable shape and a method of using.

2. Background

One-off tooling is produced for some manufacturing processes. One-off tooling is tooling created for a single use in a unique location. The tooling for composite rework is one-off tooling and not reusable because every location is unique.

Conventional one-off tooling is created from fiberglass. Creating fiberglass tooling for composite rework takes an undesirable amount of time. Using and disposing of the one-off tooling may produce an undesirable amount of waste. Therefore, it would be desirable to have a method and apparatus that take into account at least some of the issues discussed above, as well as other possible issues.

SUMMARY

An illustrative embodiment of the present disclosure provides a tool configured to have a changeable shape. The tool comprises a thermoplastic polymeric material, resistive heating elements within the thermoplastic polymeric material, and a flexible casing encapsulating the thermoplastic polymeric material and resistive heating elements.

Another illustrative embodiment of the present disclosure provides a method. A tool configured to have a changeable shape is heated. The tool comprises a thermoplastic polymeric material, resistive heating elements within the thermoplastic polymeric material, and a flexible casing encapsulating the thermoplastic polymeric material and resistive heating elements. Heating the tool comprises heating the tool using the resistive heating elements until the thermoplastic polymeric material is flexible. The tool is applied to a component while heating the tool. The tool is cooled while the tool is applied to the component to form the tool into a first shape.

A further illustrative embodiment of the present disclosure provides a method. A tool configured to have a changeable shape is heated. The tool comprises a thermoplastic polymeric material, resistive heating elements within the thermoplastic polymeric material, and a flexible casing encapsulating the thermoplastic polymeric material and resistive heating elements. Heating the tool comprises heating the tool using the resistive heating elements until the thermoplastic polymeric material is flexible. The tool is shaped into a first shape. The tool is cooled in the first shape to form a mold.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that manufacturing conventional fiberglass tooling may take between 16-24 hours. The illustrative examples recognize and take into account that it would be desirable to replace time-consuming fiberglass tooling.

The illustrative examples recognize and take into account that a reusable and re-moldable tool would save at least one of manufacturing time or tooling material costs. The illustrative examples further recognize and take into account that an internally-heated thermoplastic material would provide a re-moldable tool.

The illustrative examples also recognize and take into account that a reusable and re-moldable tool would find use outside of industrial manufacturing. For example, the illustrative examples recognize and take into account that a reusable and re-moldable tool would have household uses such as arts and crafts, household repairs, food molds, or other molding processes. The illustrative examples recognize and take into account that a reusable and re-moldable tool could be used to form edible materials, metals, plastics, ceramics, or any other desirable type of material.

Figure 1:
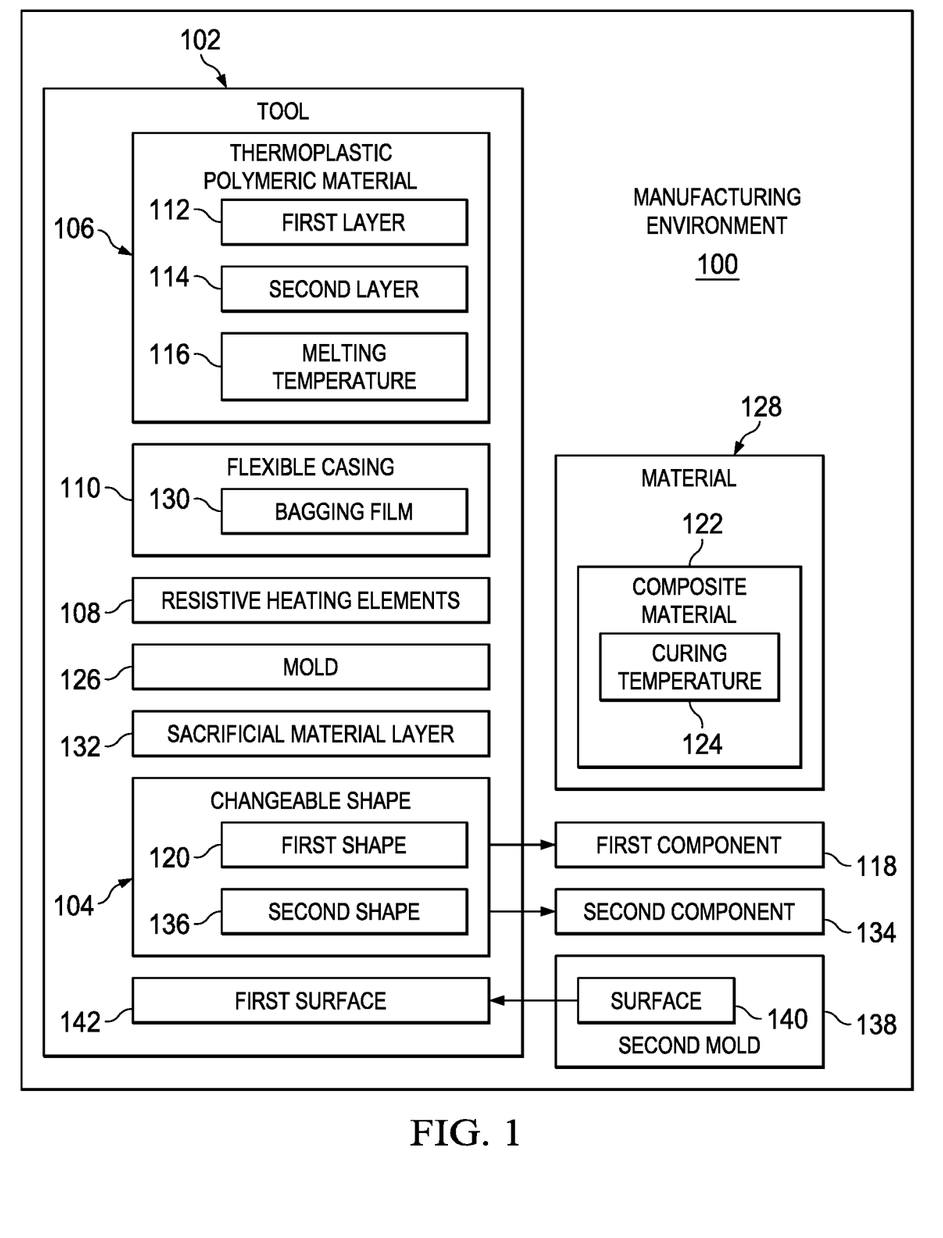
FIG. 1 is an illustration of a block diagram of a manufacturing environment in accordance with an illustrative embodiment.

With reference now to the figures and, in particular, with reference to FIG. 1, an illustration of a block diagram of a manufacturing environment is depicted in accordance with an illustrative embodiment. Manufacturing environment 100 includes tool 102 configured to have changeable shape 104. Tool 102 comprises thermoplastic polymeric material 106, resistive heating elements 108 within thermoplastic polymeric material 106, and flexible casing 110 encapsulating thermoplastic polymeric material 106 and resistive heating elements 108.

Thermoplastic polymeric material 106 includes any desirable number of thermoplastic polymers. In one illustrative example, thermoplastic polymeric material 106 includes one thermoplastic polymer. In another illustrative example, thermoplastic polymeric material 106 includes a mix of thermoplastic polymers. In some illustrative examples, thermoplastic polymeric material 106 further includes at least one filler. A filler for thermoplastic polymeric material 106 make take the form of microspheres, fibers, or any other desirable type of filler.

In some illustrative examples, thermoplastic polymeric material 106 comprises first layer 112 of thermoplastic polymeric material 106 and second layer 114 of thermoplastic polymeric material 106 sandwiching resistive heating elements 108. Thermoplastic polymeric material 106 flows relative to resistive heating elements 108 when heated to melting temperature 116.

Melting temperature 116 is selected to take into account any desirable considerations. For example, melting temperature 116 may be selected by taking into account materials of first component 118.

Tool 102 is applied to first component 118 to form tool 102 to first shape 120. Tool 102 is heated using resistive heating elements 108 until thermoplastic polymeric material 106 is flexible. Tool 102 is applied to first component 118 while heating tool 102 using resistive heating elements 108. It is undesirable for melting temperature 116 to be high enough to damage the material of first component 118. Thus, melting temperature 116 may be selected by taking into account the material of first component 118.

In another illustrative example, tool 102 is configured to cure composite material 122 by heating tool 102 using resistive heating elements 108. In this illustrative example, thermoplastic polymeric material 106 is selected such that thermoplastic polymeric material 106 has melting temperature 116 above curing temperature 124 of composite material 122.

In some illustrative examples, melting temperature 116 is selected by taking into account at least one of time or energy to heat thermoplastic polymeric material 106 to melting temperature 116 using resistive heating elements 108. For example, melting temperature 116 is selected to minimize energy required to heat thermoplastic polymeric material 106 to melting temperature 116.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

After shaping tool 102 into first shape 120, tool 102 is cooled in first shape 120 to form mold 126. Mold 126 is used to shape material 128. In some illustrative examples, material 128 is a rework portion for first component 118. In some illustrative examples, material 128 is used to duplicate first component 118.

Material 128 may be any desirable type of material. For example, material 128 may be a polymeric material. As another example, material 128 may be metal. As yet a further example, material 128 may be an edible material. In some illustrative examples, material 128 is composite material 122. In these illustrative examples, tool 102 is used for at least one of shaping or curing composite material 122.

Flexible casing 110 encapsulates thermoplastic polymeric material 106 such that thermoplastic polymeric material 106 does not leak or run when thermoplastic polymeric material 106 is heated to melting temperature 116. Flexible casing 110 is selected based on chemical reactivity to thermoplastic polymeric material 106, stability at melting temperature 116, flexibility, or any other desirable properties. In some illustrative examples, flexible casing 110 is a replaceable material.

In some illustrative examples, flexible casing 110 comprises bagging film 130. In some illustrative examples, bagging film 130 may be described as a high elongation bagging film. In these illustrative examples, high elongation bagging films achieve elongation over 400%. Some high elongation films can achieve up to 500% elongation.

Tool 102 includes any other desirable layers. In one illustrative example, tool 102 includes sacrificial material layer 132. Sacrificial material layer 132 may be a release film. Sacrificial material layer 132 may be peeled away from at least one of tool 102 or material 128 to remove material 128 from tool 102. In some illustrative examples, sacrificial material layer 132 is adhered to flexible casing 110.

After forming material 128 using tool 102, tool 102 may be reshaped. Tool 102 may be returned to a neutral shape.

Tool 102 having first shape 120 is heated using resistive heating elements 108 until thermoplastic polymeric material 106 is flexible. Tool 102 having first shape 120 is applied onto second component 134 while heating tool 102 having first shape 120 using resistive heating elements 108. Tool 102 is cooled while tool 102 is applied to second component 134 to form tool 102 into second shape 136. In some illustrative examples, second shape 136 is substantially planar.

In some illustrative examples, tool 102 may not directly shape material 128. In these illustrative examples, second mold 138 is formed using tool 102 having first shape 120. Second mold 138 has surface 140 complementary to first surface 142 of mold 126.

By forming second mold 138, material 128 is formed to fit within a hollow of first component 118. For example, first surface 142 of tool 102 may be shaped to a hollow in first component 118. By forming surface 140 complementary to first surface 142, surface 140 is substantially the same as the hollow of first component 118.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, manufacturing environment 100 may further include an autoclave for curing composite material 122. As another example, manufacturing environment 100 may further include a third component. Tool 102 may be formed to the third component to act as a mold having a third shape, similar to shaping to first component 118.

Figure 2:
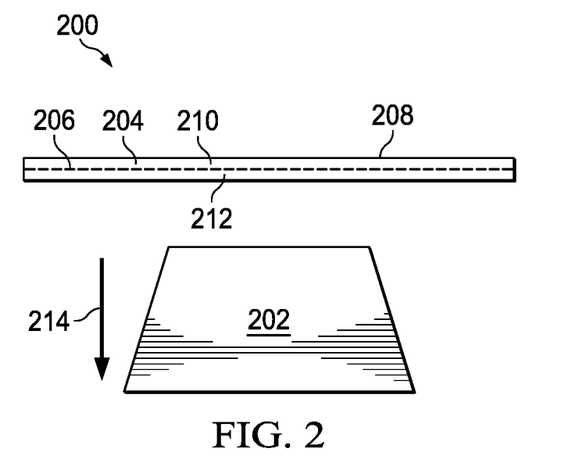
FIG. 2 is an illustration of a tool and a first component in accordance with an illustrative embodiment.

Turning now to FIG. 2, an illustration of a tool and a first component is depicted in accordance with an illustrative embodiment. Tool 200 is a physical implementation of tool 102 of FIG. 1. First component 202 is a physical implementation of first component 118 of FIG. 1.

Tool 200 is configured to have a changeable shape. As depicted, tool 200 is substantially planar. Tool 200 comprises thermoplastic polymeric material 204, resistive heating elements 206 within thermoplastic polymeric material 204, and flexible casing 208 encapsulating thermoplastic polymeric material 204 and resistive heating elements 206. As depicted, thermoplastic polymeric material 204 comprises first layer 210 of thermoplastic polymeric material 204 and second layer 212 of thermoplastic polymeric material 204 sandwiching resistive heating elements 206.

In some illustrative examples, first component 202 is a component to undergo rework. In other illustrative examples, first component 202 is a component to be duplicated. As depicted, first component 202 has a substantially trapezoidal cross-section. However, first component 202 may be any desirable shape.

To shape tool 200, tool 200 is moved in direction 214 towards first component 202. Tool 200 is then applied to first component 202 while heating tool 200. Tool 200 is heated using resistive heating elements 206 until thermoplastic polymeric material 204 is flexible.

Figure 3:
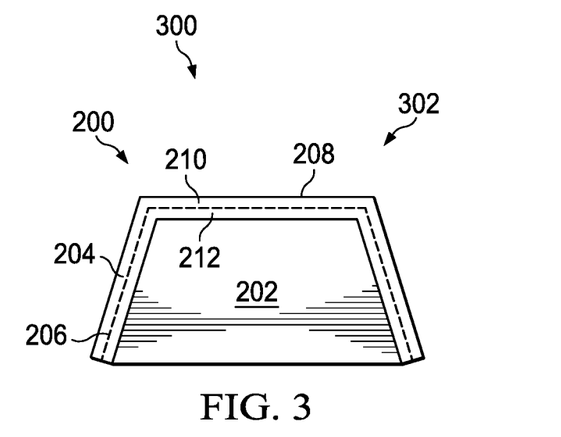
FIG. 3 is an illustration of a tool applied to a first component in accordance with an illustrative embodiment.

Turning now to FIG. 3, an illustration of a tool applied to a first component is depicted in accordance with an illustrative embodiment. View 300 is a view of tool 200 applied to first component 202. Tool 200 is applied to first component 202 while heating tool 200 using resistive heating elements 206. Afterwards, tool 200 is cooled while tool 200 is applied to first component 202 to form tool 200 into first shape 302.

Figure 4:
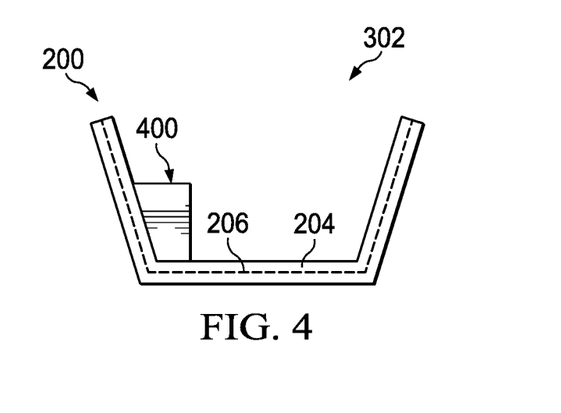
FIG. 4 is an illustration of a material within a tool having a first shape in accordance with an illustrative embodiment.

Turning now to FIG. 4, an illustration of a material within a tool having a first shape is depicted in accordance with an illustrative embodiment. Tool 200 is depicted after having cooled. After cooling tool 200, tool 200 having first shape 302 is removed from first component 202 (FIGS. 2 and 3).

As depicted, material 400 is placed onto tool 200 having first shape 302. Material 400 is a physical implementation of material 128 of FIG. 1. In some illustrative examples, material 400 is representative of a portion of first component 202 (FIGS. 2 and 3) to be reworked. In these illustrative examples, the portion of first component 202 to be reworked is excised from first component 202, and material 400 is positioned in the resulting hollow in first component 202.

In other illustrative examples, first component 202 may be completely duplicated. In these illustrative examples, material 400 may be only a portion of the material to be added to tool 200. In these illustrative examples, additional material is added onto material 400 to fill first shape 302 of tool 200.

In some illustrative examples, material 400 is a composite material. In these illustrative examples, tool 200 is configured to cure the composite material by heating tool 200 using resistive heating elements 206, and wherein thermoplastic polymeric material 204 is selected such that thermoplastic polymeric material 204 has a melting temperature above a curing temperature of the composite material.

Figure 5:
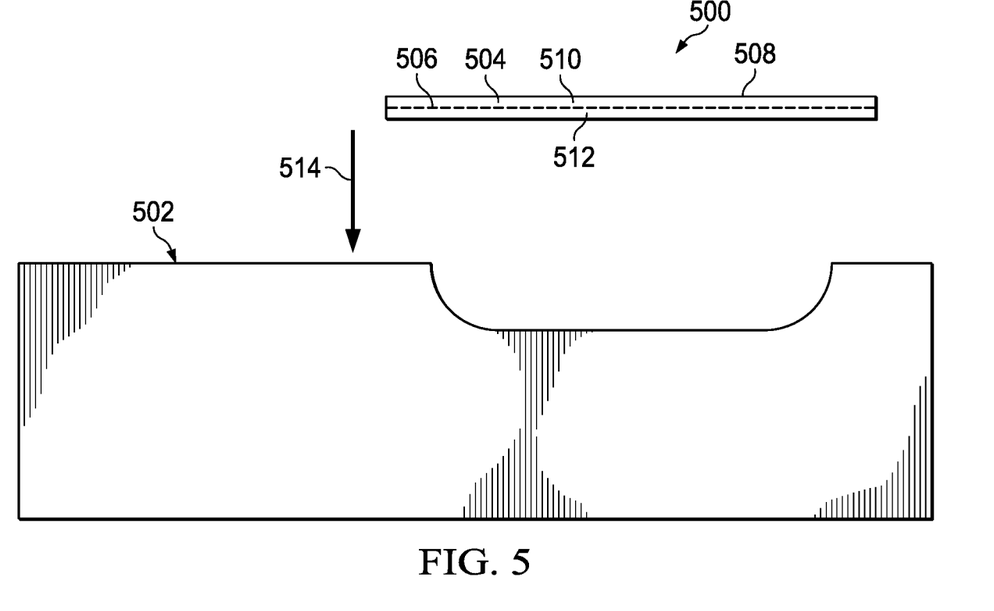
FIG. 5 is an illustration of a tool and a first component in accordance with an illustrative embodiment.

Turning now to FIG. 5, an illustration of a tool and a first component is depicted in accordance with an illustrative embodiment. Tool 500 is a physical implementation of tool 102 of FIG. 1. First component 502 is a physical implementation of first component 118 of FIG. 1.

Tool 500 is configured to have a changeable shape. As depicted, tool 500 is substantially planar. Tool 500 comprises thermoplastic polymeric material 504, resistive heating elements 506 within thermoplastic polymeric material 504, and flexible casing 508 encapsulating thermoplastic polymeric material 504 and resistive heating elements 506. As depicted, thermoplastic polymeric material 504 comprises first layer 510 of thermoplastic polymeric material 504 and second layer 512 of thermoplastic polymeric material 504 sandwiching resistive heating elements 506.

In some illustrative examples, first component 502 is a component undergoing rework. In other illustrative examples, first component 502 is a component to be completed. As depicted, first component 502 has a half ovular hollow. However, first component 502 may be any desirable shape.

To shape tool 500, tool 500 is moved in direction 514 towards first component 502. Tool 500 is then applied to first component 502 while heating tool 500. Tool 500 is heated using resistive heating elements 506 until thermoplastic polymeric material 504 is flexible.

Figure 6:
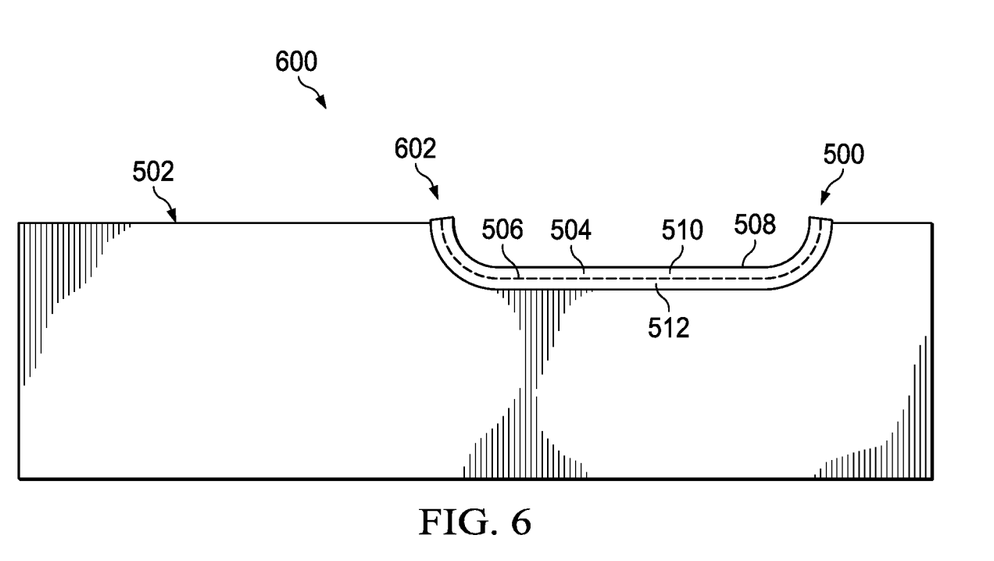
FIG. 6 is an illustration of a tool applied to a first component in accordance with an illustrative embodiment.

Turning now to FIG. 6, an illustration of a tool applied to a first component is depicted in accordance with an illustrative embodiment. View 600 is a view of tool 500 applied to first component 502. Tool 500 is applied to first component 502 while heating tool 500 using resistive heating elements 506. Afterwards, the tool 500 is cooled while tool 500 is applied to first component 502 to form tool 500 into first shape 602.

Figure 7:
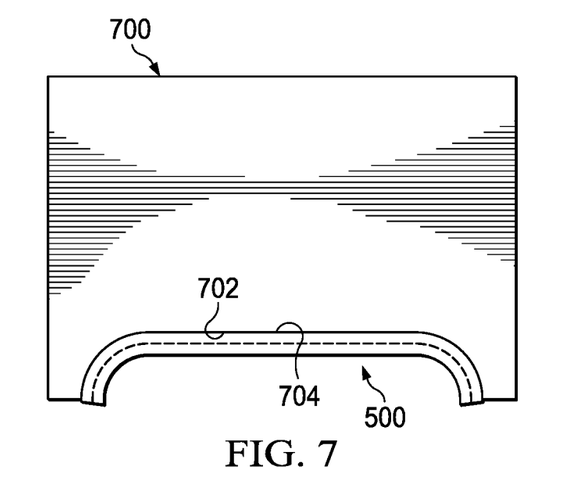
FIG. 7 is an illustration of a second mold formed using a tool having a first shape in accordance with an illustrative embodiment.

Turning now to FIG. 7, an illustration of a second mold formed using a tool having a first shape is depicted in accordance with an illustrative embodiment.

Tool 500 is depicted after having cooled. After cooling tool 500, tool 500 having first shape 602 was removed from first component 502 (FIGS. 5 and 6).

Second mold 700 having surface 702 complementary to first surface 704 of tool 500 is formed. Second mold 700 may be formed of any desirable mold material.

Figure 8:
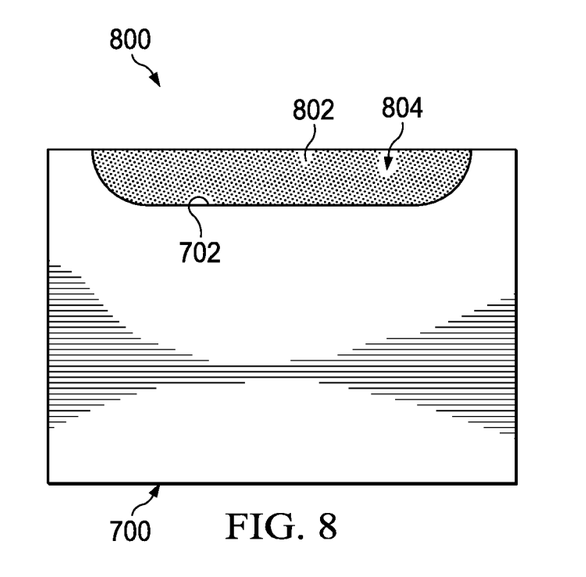
FIG. 8 is an illustration of a material within a second mold in accordance with an illustrative embodiment.

Turning now to FIG. 8, an illustration of a material within a second mold is depicted in accordance with an illustrative embodiment. In view 800, material 802 is placed into hollow 804 of surface 702 of second mold 700. In one illustrative example, material 802 may be a patch for first component 502 of FIGS. 5 and 6. In another illustrative example, material 802 completes first component 502.

The illustrations of manufacturing environment 100 of FIG. 1, tool 200 and tool 500 in FIGS. 2-7, and second mold 700 of FIGS. 7-8 are not meant to imply physical or architectural limitations to the manner in which an illustrative embodiment may be implemented. Other components, in addition to or in place of the ones illustrated, may be used. Some components may be unnecessary.

The different components shown in FIGS. 2-8 may be combined with components in FIG. 1, used with components in FIG. 1, or a combination of the two. Additionally, some of the components in FIGS. 2-8 may be illustrative examples of how components shown in block form in FIG. 1 may be implemented as physical structures.

Figure 9:
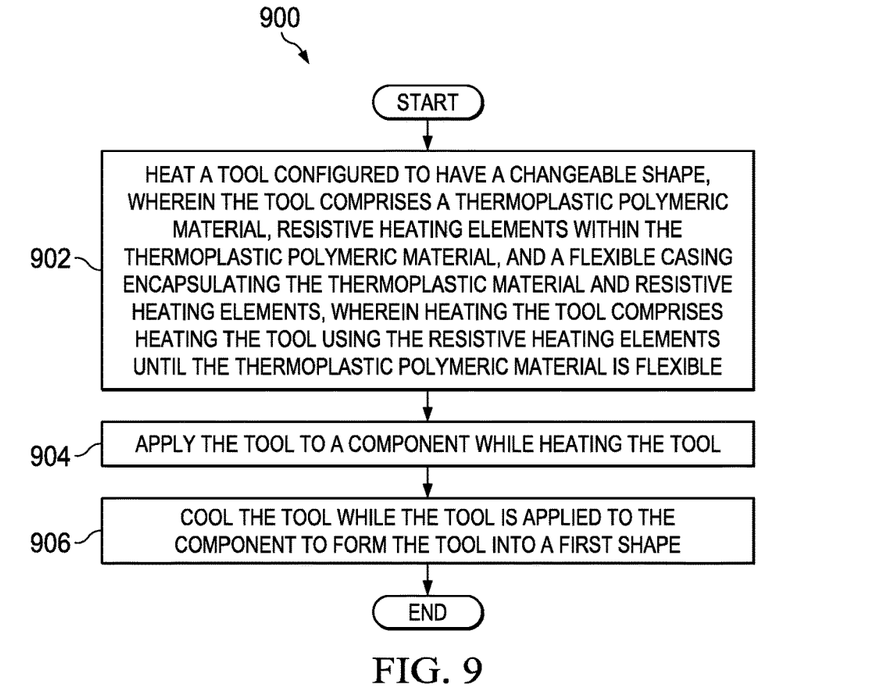
FIG. 9 is an illustration of a flowchart of a method for forming a tool into a first shape in accordance with an illustrative embodiment.

Turning now to FIG. 9, an illustration of a flowchart of a method for forming a tool into a first shape is depicted in accordance with an illustrative embodiment. Method 900 may be performed using tool 102 and first component 118 of FIG. 1. Method 900 may be performed using tool 200 of FIGS. 2-4. Method 900 may be performed using tool 500 of FIGS. 5-7.

Method 900 heats a tool configured to have a changeable shape, wherein the tool comprises a thermoplastic polymeric material, resistive heating elements within the thermoplastic polymeric material, and a flexible casing encapsulating the thermoplastic polymeric material and resistive heating elements, wherein heating the tool comprises heating the tool using the resistive heating elements until the thermoplastic polymeric material is flexible (operation 902). In some illustrative examples, heating the tool further comprises heating the thermoplastic polymeric material of the tool to a melting temperature of the thermoplastic polymeric material.

Method 900 applies the tool to a component while heating the tool (operation 904). Method 900 cools the tool while the tool is applied to the component to form the tool into a first shape (operation 906). Afterwards, the process terminates.

Figure 10:
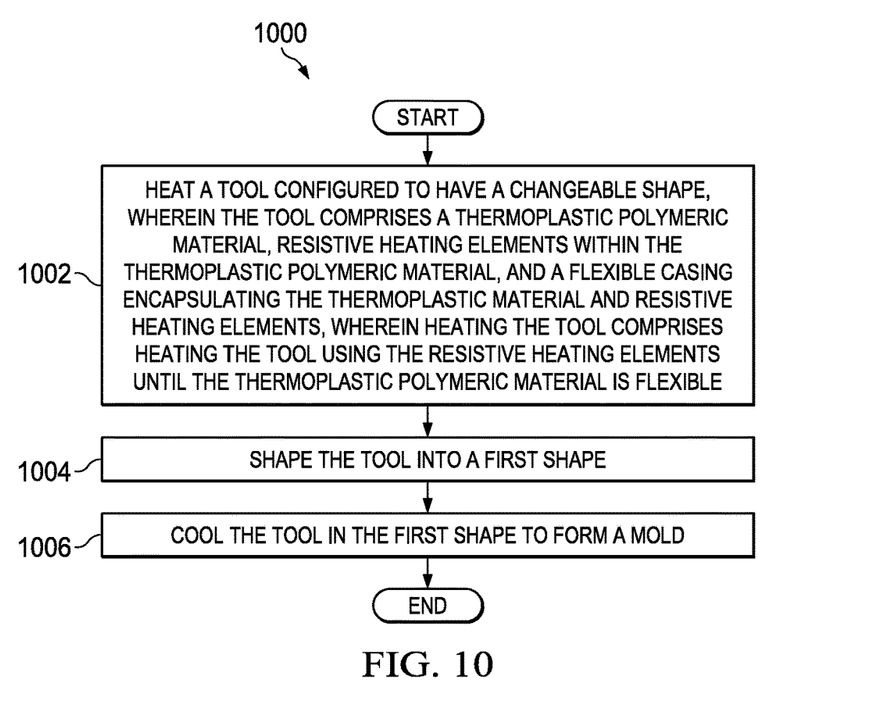
FIG. 10 is an illustration of a flowchart of a method for forming a mold in accordance with an illustrative embodiment.

Turning now to FIG. 10, an illustration of a flowchart of a method for forming a mold is depicted in accordance with an illustrative embodiment. Method 1000 may be performed using tool 102 and first component 118 of FIG. 1. Method 1000 may be performed using tool 200 of FIGS. 2-4. Method 1000 may be performed using tool 500 of FIGS. 5-7.

Method 1000 heats a tool configured to have a changeable shape, wherein the tool comprises a thermoplastic polymeric material, resistive heating elements within the thermoplastic polymeric material, and a flexible casing encapsulating the thermoplastic polymeric material and resistive heating elements, wherein heating the tool comprises heating the tool using the resistive heating elements until the thermoplastic polymeric material is flexible (operation 1002). Method 1000 shapes the tool into a first shape (operation 1004). Method 1000 cools the tool in the first shape to form a mold (operation 1006). Afterwards, the process terminates.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, method 900 of FIG. 9 may further comprise removing the tool having the first shape from the component and placing a material onto the tool having the first shape. In some illustrative examples, the material is a composite material, and method 900 further comprises curing the composite material by heating the tool using the resistive heating elements. In one illustrative example, a curing temperature of the composite material is below a melting temperature of the thermoplastic polymeric material.

As another example, method 900 may further comprise heating the tool having the first shape using the resistive heating elements until the thermoplastic polymeric material is flexible, applying the tool having the first shape onto a second component while heating the tool having the first shape, and cooling the tool while the tool is applied to the second component to form the tool into a second shape. In one illustrative example, the second shape is substantially flat.

As yet a further example, method 900 may further comprise removing the tool having the first shape from the component, forming a second mold using the tool having the first shape, and placing a material onto the second mold.

As another example, method 1000 of FIG. 10 may further comprise applying a composite material to the mold, and curing the composite material by heating the mold using the resistive heating elements. In a further example, method 1000 may further comprise forming a second mold having a surface complementary to a first surface of the mold.

In yet a further example, method 1000 may further comprise heating the mold using the resistive heating elements until the thermoplastic polymeric material is flexible, shaping the tool into a second shape, and cooling the tool to hold the tool in the second shape. In one illustrative example, the second shape is substantially flat.

The illustrative embodiments provide a tool configured to have a changeable shape. A reusable, re-moldable, internally heated tool is presented. The illustrative examples replace time-consuming fiberglass tooling. Using the internally heated tool would have at least one of a lower manufacturing time or lower material costs than conventional fiberglass tooling.

The illustrative examples present an internally heated, thermoplastic tool that can be vacuumed down, brought up to temperature and then used as a mandrel on which to cure composite material. The illustrative examples could be retooled to any shape, and used as a heated tool.

The illustrative examples present a cost savings compared to conventional processes. The illustrative examples cut down on hours and material to make tooling. The tool configured to have a changeable shape is internally heated with resistive heating elements similar to a heating blanket. However, unlike heating blankets, the tool configured to have a changeable shape holds its form. Specifically, the tool holds its shape after forming. The tool is also reusable. This tool could be used to heat the part (heated tool). This tool could potentially heat rework areas also. The illustrative examples provide a splash off tool for repairs of composite airplanes. The tool is reusable and can serve to heat the part.

The illustrative examples heat up a thermoplastic and then form it in place. The formed thermoplastic polymeric tool allows for creating a high temperature part based on an area to be reworked. The illustrative examples may have a mold release film on the thermoplastic polymeric tool. The illustrative examples may turn the thermoplastic polymeric tool up to temp and turn it off to get a part. The thermoplastic in the illustrative examples desirably becomes malleable, is viscous, and does not have wrinkles. The thermoplastic desirably does not have thin spots. A fiber layer or other type of flexible casing may be present to hold the thermoplastic polymeric material in place so it doesn't bunch up or poke out.

The illustrative examples present a method of reworking or repairing a structure. An internally heated tool is applied to an area to be repaired or reworked. The internally heated tool is heated to a melting temperature. A vacuum is applied over the internally heated tool. The area to be reworked is removed. Repair or replacement parts are formed in the internally heated tool. The internally heated tool is made from a thermoplastic. The internally heated tool can be re-used. After reworking the structure, the internally heated tool is laid on a flat surface. The internally heated tool is heated to a melting temperature, applying the vacuum over the internally heated tool.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A tool configured to have a changeable shape, the tool comprising:
    a thermoplastic polymeric material comprising a first layer and a second layer;
    resistive heating elements sandwiched between the first layer of the thermoplastic polymeric material and the second layer of the thermoplastic polymeric material, wherein the resistive heating elements extend from a first lateral extent of the tool to an opposing second lateral extent of the tool between the first and second layers of the thermoplastic polymeric material; and
    a flexible casing encapsulating the first layer of the thermoplastic polymeric material, the second layer of the thermoplastic polymeric material, and the resistive heating elements such that the thermoplastic polymeric material does not leak or run when the thermoplastic polymeric material is heated to its melting temperature.

2. The tool of claim 1, wherein the tool is configured to cure a composite material by heating the tool using the resistive heating elements, and wherein the thermoplastic polymeric material is selected such that the thermoplastic polymeric material has a melting temperature above a curing temperature of the composite material.

3. The tool of claim 1, wherein the flexible casing comprises a bagging film.

4. The tool of claim 1, wherein the tool further comprises a sacrificial material layer adhered to the flexible casing.

5. A method comprising:
    heating a tool configured to have a changeable shape, wherein the tool comprises a thermoplastic polymeric material comprising a first layer and a second layer, resistive heating elements sandwiched between the first layer of the thermoplastic polymeric material and the second layer of the thermoplastic polymeric material, and a flexible casing encapsulating the first layer of the thermoplastic polymeric material and the second layer of the thermoplastic polymeric material and the resistive heating elements such that the thermoplastic polymeric material does not leak or run when the thermoplastic polymeric material is heated to its melting temperature, wherein heating the tool comprises heating the tool using the resistive heating elements until the thermoplastic polymeric material is flexible and the first and second layers of the thermoplastic polymeric material are substantially planar prior to heating the tool;
    applying the tool to a component while heating the tool; and
    cooling the tool while the tool is applied to the component to form the tool into a first shape.

6. The method of claim 5, wherein heating the tool further comprises heating the thermoplastic polymeric material of the tool to a melting temperature of the thermoplastic polymeric material.

7. The method of claim 5 further comprising:
    removing the tool having the first shape from the component; and
    placing a material onto the tool having the first shape.

8. The method of claim 7 wherein the material is a composite material, the method further comprising:
    curing the composite material by heating the tool using the resistive heating elements.

9. The method of claim 8, wherein a curing temperature of the composite material is below a melting temperature of the thermoplastic polymeric material.

10. The method of claim 5 further comprising:
    heating the tool having the first shape using the resistive heating elements until the thermoplastic polymeric material is flexible;
    applying the tool having the first shape onto a second component while heating the tool having the first shape; and
    cooling the tool while the tool is applied to the second component to form the tool into a second shape.

11. The method of claim 10, wherein the second shape is substantially flat.

12. The method of claim 5 further comprising:
    removing the tool having the first shape from the component;
    forming a mold using the tool having the first shape; and
    placing a material onto the mold.

13. The tool of claim 1, wherein
    an exposed surface of at least one of the first layer or the second layer is substantially planar.

14. A tool configured to have a changeable shape, the tool comprising:
    a thermoplastic material having a first layer and a second layer;
    resistive heating elements sandwiched between the first layer of the thermoplastic material and the second layer of the thermoplastic material, wherein the resistive heating elements extend from a first lateral extent of the tool to an opposing second lateral extent of the tool and an exposed surface of at least one of the first layer of the thermoplastic material or the second layer of the thermoplastic material is substantially planar from the first lateral extent to the opposing second lateral extent; and
    a flexible casing encapsulating the thermoplastic material such that the thermoplastic polymeric material does not leak or run when the thermoplastic polymeric material is heated to its melting temperature.

15. The tool of claim 14, wherein the tool is configured to cure a composite material by heating the tool using the resistive heating elements.

16. The tool of claim 15, wherein the thermoplastic material is selected such that the thermoplastic material has a melting temperature above a curing temperature of the composite material.

17. The tool of claim 14, wherein the flexible casing comprises a bagging film.

18. The tool of claim 14, wherein the tool further comprises a sacrificial material layer.

19. The tool of claim 18, wherein the sacrificial material layer is adhered to the flexible casing.

20. The tool of claim 18, wherein the sacrificial material layer is a release film.

* * * * *